United States Patent [19]

Banfelder

[11] Patent Number: 5,100,331
[45] Date of Patent: Mar. 31, 1992

[54] CURRENT CONDUCTOR CONNECTOR TO BRIDGE OVER CONDUCTOR INTERRUPTIONS BETWEEN MUTUALLY ROTATING PARTS

[75] Inventor: Elmar Banfelder, Sulzbach, Fed. Rep. of Germany

[73] Assignee: Petri AG Co., Fed. Rep. of Germany

[21] Appl. No.: 580,924

[22] Filed: Sep. 12, 1990

[30] Foreign Application Priority Data

Sep. 12, 1989 [DE] Fed. Rep. of Germany ....... 3930494
Oct. 12, 1989 [EP] European Pat. Off. ........ 89118947.4

[51] Int. Cl.⁵ ............................................. H01R 39/02
[52] U.S. Cl. ....................................... 439/15; 439/164
[58] Field of Search .................................. 439/15, 164

[56] References Cited

U.S. PATENT DOCUMENTS 4,921,428 5/1990 Sasaki et al. ........................ 439/15

Primary Examiner—Eugene F. Desmond
Attorney, Agent, or Firm—Robert J. Koch

[57] ABSTRACT

Current conduction connector to bridge over interruptions of conduction between mutually rotating parts, in particular between a steering wheel and a steering column. The assembly includes a housing equipped with an outgoing conductor, a cover, as the stator mounted on the steering column, and a rotor, rotatingly supported in the housing. The rotor is also equipped with an outgoing conductor connected to the steering wheel. The housing and rotor define an annular space surrounding which contains an insulated conductor strip would several times around the rotor and terminated at the outgoing conductors The bottom of the housing and the cover may both be provided with a layer of a textile insulating material. The textile insulating material may be a polyethylene fiber web, densified by a binder into a highly abrasion resistant felt. The layer of felt may be fastened to the bottom of the housing and to the cover with a self-adhesive coating.

4 Claims, 1 Drawing Sheet

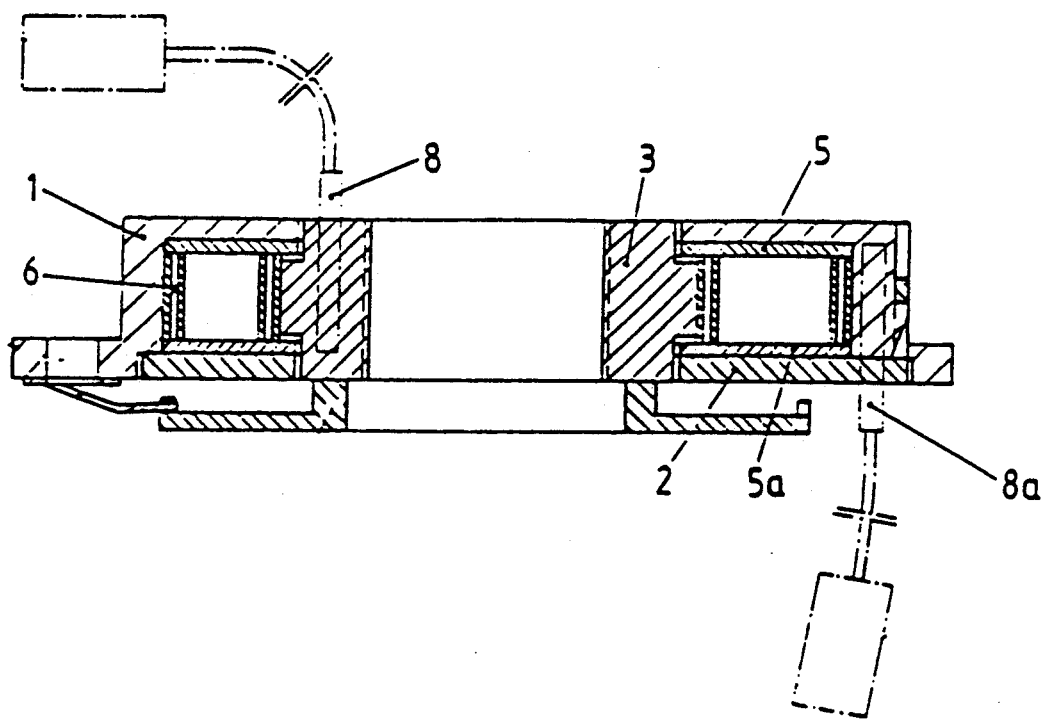

CURRENT CONDUCTOR CONNECTOR TO BRIDGE OVER CONDUCTOR INTERRUPTIONS BETWEEN MUTUALLY ROTATING PARTS

BACKGROUND OF THE INVENTION

1. Field of Invention

The invention relates to a current conductor connection and more particularly a connector for bridging interruptions between mutually rotating parts.

2. Description of the Related Technology

Current conductor connectors of the type described are used in particular to establish an electrical connection between a power source and the protective gas bag receptacle located in an automotive vehicle in steering wheel cavity. The insulated strip conductor in the housing space is long enough to follow the rotation of the steering wheel which amounts to about three revolutions on either side. The strip conductor widens to the outside during deflection of the steering wheel from a center position in one direction until it abuts against the stationary housing, and contracts inwardly during deflection in the other direction until it abuts against the rotor.

Prior current conductors have worked well in actual practice, but have the disadvantage that the strip conductors located in the housing generate scratching noises during normal movements of the steering wheel and a strong rattling noise in case of vigorous jarring, for example when traveling on an uneven terrain or in curves.

SUMMARY OF THE INVENTION

It is an object of the present invention to provide a current conductor which prevents noise in a simple manner. This object may be achieved by a current conduction connector which bridges over interruptions of a conductive path between mutually rotating parts such as between a steering wheel and a steering column. The connector is made up of a housing equipped with an outgoing conductor. The housing has a cover which may be the stator mounted on the steering column A rotor is rotatingly supported within the housing. The rotor is equipped with an outgoing conductor connected with the steering wheel. The housing and rotor define an annular space surrounding the rotor which contains a wound insulated strip conductor 8, 8a). The bottom or interior surfaces of the housing and the cover are advantageously provided with a layer of textile insulating material. The textile insulating material may be a polyethylene fiber web, densified by a binder into a highly abrasion resistant felt. The felt layer may be fastened to the bottom of the housing and to the cover by a self adhesive layer.

The invention provides a current conduction conductor which prevents noise by locating a strip between textile layers. The layers damp the slapping of the windings upon each other thereby reducing noise in all but extreme situations. It was discovered surprisingly that in spite of the tight guidance of the strip conductor with its edges on the coating layer over extended periods of time, the abrasion originally anticipated caused by textile material and the impairment of the operation resulting there, does not occur.

Further embodiments and advantages are set forth in the following description, in which the invention is described by reference to the drawing.

BRIEF DESCRIPTION OF THE DRAWING

The Figure shows a connector according to the invention.

DETAILED DESCRIPTION OF THE PREFERRED EMBODIMENT

The current conduction connector shown in the drawing to bridge over conductor interruptions between the fixedly mounted steering column and a steering wheel rotating on the steering column includes stator mounted by a housing 1 with an outgoing conductor 8a and a cover 2, and a rotor 3 rotatingly supported in the housing 1, 2, which is also equipped with an outgoing conductor 8. The housing 1, 2 and the rotor 3 are connected to the steering wheel and surround an annular space containing the strip conductor wrapped around the rotor in several windings and terminating in the outgoing conductors 8, 8a.

The outgoing conductors may include a contact pin. The ends of the strip conductor may be fastened to the contact pins. The strip conductor 6 itself may be passed through the rotor or the housing, for example by injection molding, so that the strip conductor itself forms the outgoing conductors.

The bottom of the housing 1 and the cover 2 are provided with a layer of a textile insulating material 5 and 5a. The material may be a polyethylene fiber web or another suitable material, densified by a binder into a highly abrasion resistant insulating felt. The felt layer may be fastened by any known means, such as a self-adhesive layer, to the bottom of the housing and the cover.

I claim:

1. A connector comprising:
   a housing;
   a housing cover connected to said housing;
   a rotor located within said housing configured to rotate relative to said housing, wherein said rotor and said housing define an annular space;
   a first outgoing conductor connected to said housing;
   a second outgoing conductor connected to said rotor;
   a conductor strip located in said annular space, connected to said first and second outgoing conductors and wound around said rotor;
   a first layer of textile insulating material connected to an interior surface to said cover; and
   a second layer of textile insulating material connected to an interior surface of said housing.

2. A connector according to claim 1 wherein said material is a high abrasion felt, binder densified polyethylene fiber web.

3. A connector according to claim 3 further comprising self-adhesive layers between said first layer of textile insulating material and said interior surface of said cover and between said second layer of textile insulating material and said interior surface of said housing.

4. A connector according to claim 1 wherein said conductor strip is an insulated conductor strip.

* * * * *